July 8, 1952  J. W. KINNEY, JR  2,602,568
BAKE PAN

Filed March 21, 1947  2 SHEETS—SHEET 1

INVENTOR.
John W. Kinney Jr.

July 8, 1952  J. W. KINNEY, JR  2,602,568
BAKE PAN

Filed March 21, 1947  2 SHEETS—SHEET 2

INVENTOR.
John W. Kinney Jr.

Patented July 8, 1952

2,602,568

UNITED STATES PATENT OFFICE 2,602,568

BAKE PAN

John W. Kinney, Jr., Cincinnati, Ohio

Application March 21, 1947, Serial No. 736,259

2 Claims. (Cl. 220—97)

This invention relates to baking pans. One aspect of the invention is directed to a method and means for effectively precluding jamming or sticking together of nested baking pans. Another aspect of the invention is to provide a unique rim or bead for baking pans which rims reinforce the pans and allow the same to be more effectively handled by the user, and additionally provides the means for nesting or stacking a plurality of pans so that the body portion of a superjacent pan is definitely spacedly suspended from and within a subjacent pan without jamming or sticking together yet forming a stable stack of a plurality of nested pans which will not topple over or otherwise become accidentally displaced, one pan with respect to another or others.

An object of the invention is to provide a baking pan with simple, inexpensive, yet highly efficient means which are adapted to cooperate with similar means on other similar pans, for suspending a superjacent pan from a similar subjacent pan in such a manner that corresponding walls of said pans are physically separated.

Another object of the invention is to provide a tubed bake pan of the type which includes a bottom wall having an upwardly converging hollow central tube and upwardly and outwardly tapering side walls, with means for enabling such a pan to be nested with other similar pans without jamming or sticking.

Still another object of the invention is to provide bake pans with means to prevent adjacent pans from becoming jammed or stuck together while nested, and which means will likewise positively prevent relative lateral shifting of the various pans comprising a nested group.

Still another object of the invention is to provide bake pans with means for preventing similar pans from becoming jammed or stuck together when said pans are nested and which means will effectively preclude a stack of nested pans from toppling over, thereby enabling such pans to be stacked from floor to ceiling, if desired, without danger of tipping, inasmuch as the resultant nested stack of pans is equivalent to a solid column wherein each pan is squarely supported throughout its maximum circumference by its subjacent pan.

A further object of the invention is to provide bake pans with an easy-to-grasp rim portion, thereby enabling operators and users of the pans to more easily handle them without fear of spilling the batter in the pans, prior to baking, or of damaging the final product after baking.

Still another object of the invention is to teach a method of providing a bake pan with a rim having the hereinabove described characteristics.

These and other objects are attained by the means described herein, and as disclosed in the accompanying drawings, in which.

Many attempts have been made to solve the problem of preventing similar pans from jamming or sticking together when in nested condition and, to the best of my knowledge, all efforts to preclude sticking of so-called tubed cake pans have been directed to the provision of providing various types of lugs, indentions and the like in or on the central tubular portion of such pans. However, such expedients have not proven satisfactory from a practical standpoint. One disadvantage inherent in the prior devices is that the individual pans when nested or stacked may be tipped relative to one another about their various tubular portions as fulcrums, thereby giving unsatisfactory and dangerous results, especially in those instances where it is customary to stack such pans from six to twelve feet in height, as is frequently done in the larger bakeries. A further disadvantage stems from the fact that all the weight of a stack of nested pans is carried by and concentrated on the central tubes with the result that such tubes are quickly rendered ineffective for their intended anti-jamming use and for baking purpose as the tubes become bent or distorted and dented, etc.

The instant invention is directed to the method and means of fabricating a bake pan, preferably of the one-piece seamless type, wherein the upper edge of the outer wall is provided with a down turned hollow, yet closed rim portion, having well defined upper and lower surfaces or walls or edges which are continuous and which completely circumscribe the pan. This particular rim, in addition to strengthening and lending rigidity to the upper part of the pan, serves to allow the pans to be stacked or nested without sticking or jamming of one pan to another and to render the stack of pans stable, thus negating accidental toppling over of a stack of pans.

Figure 1:
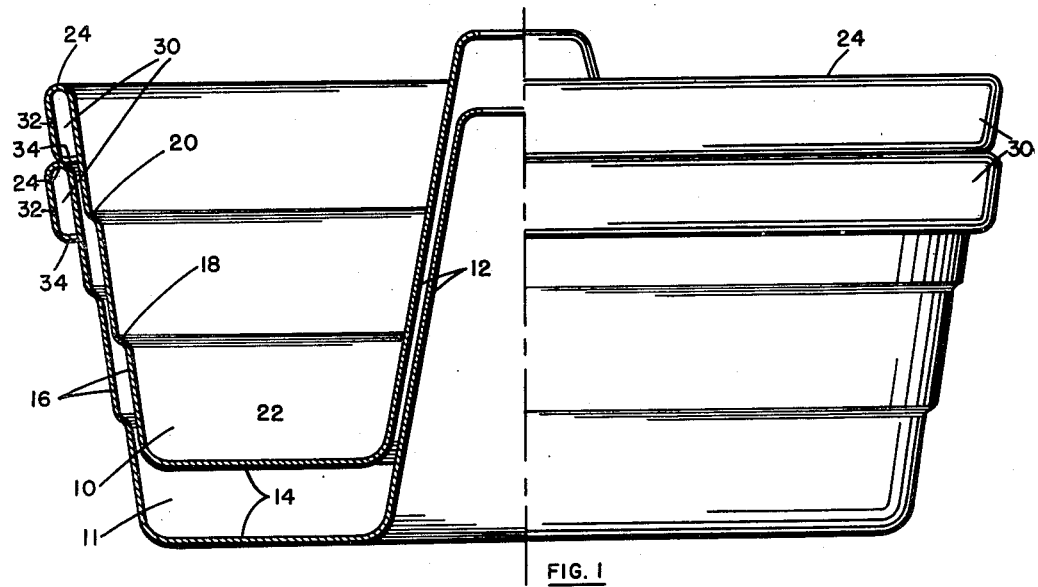
Fig. 1 is a view, partly in section, showing a pair of bake pans, embodying the teachings of the present invention, in a stacked or nested condition.

With reference now to Fig. 1, it will be noted that each of a pair of tubed bake pans, denoted generally by the numerals 10 and 11, respectively, include an upwardly converging central tube 12, a bottom 14 and upwardly and outwardly inclined side walls 16. If desired, walls 16 may be provided with a plurality of steps 18 and 20, which are primarily provided for the purpose of adding rigidity to the pan body structure, the contents of which, after baking, are adapted to be removed from the annular batter receptive chamber 22 by inverting the pan and sharply striking upper edge 24, a portion of which is gripped by the user, against a solid surface.

As is customary in said pans, central tube 12 extends or projects above upper edge 24 of side wall 16. However, the present invention is not concerned with this detail.

The upper edge of side walls 16 is turned outwardly, thence downwardly and thence inwardly for providing the hollow, closed rim denoted generally by the numeral 30, which rim includes upper edge 24, outer wall 32 and lower wall or edge 34.

Figure 5:
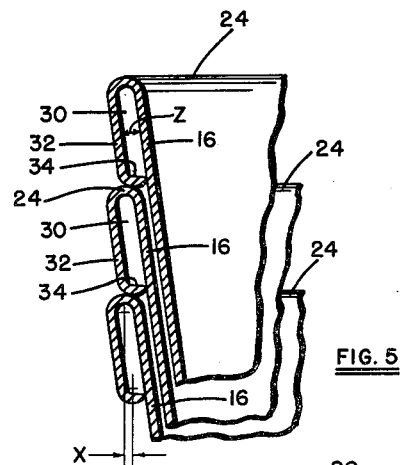
Fig. 5 is an enlarged fragmentary vertical section of the rim portion of the pans of Fig. 1 illustrating certain preferred structural details.

With particular reference now to Fig. 5, it will be noted that rim 30 is preferably, though not necessarily, fabricated in such a manner as to locate outer wall 32 in substantial parallelism with and spaced laterally from wall 16 by a dimension of from 1.5 to 4 times the thickness of wall 16. Pans made commercially wherein this distance, denoted generally by the letter Z, is twice the thickness of wall 16, and wherein the over-all height of the rim is ten times the wall thickness, the lower edge or wall 34 of rim 30 will definitely or positively fit within the perimeter defined by upper edge 24 of a similar subjacent pan, for effectively and positively precluding lateral shifting or tipping of the individual pans when nested (see Fig. 8).

As disclosed in Fig. 5, the diameter of lower edge 34 of the rim is of a dimension less than the diameter of the upper edge 24 by an amount equal to or greater than twice the thickness of side walls 16, one-half of which distance in diameter is indicated by the letter X.

Figures 6, 7:
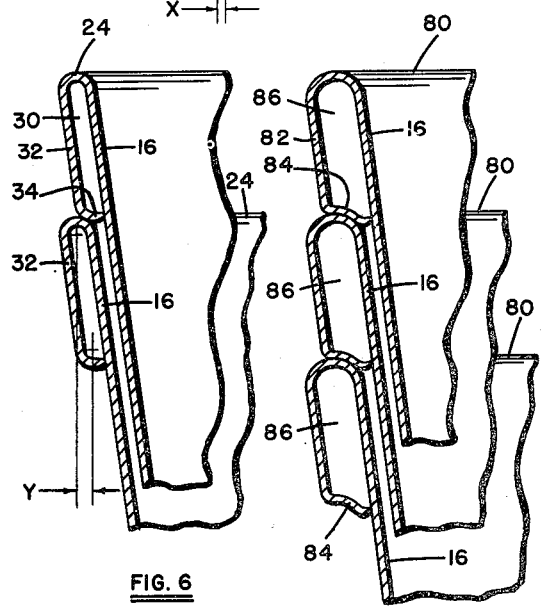
Fig. 6 is a view similar to Fig. 5 but differing therefrom solely in the depth or height dimension of the rim.
Fig. 7 is a view similar to Fig. 5 but illustrating a modified rim structure.

The primary distinction between the rims of Figs. 5 and 6 resides in the depth or over-all height of rim 30, which for a given side wall taper, will result in a greater degree of nesting by reason of the fact that dimension X of Fig. 5 will be increased to dimension Y of Fig. 6. As is apparent from a study of Figs. 5 and 6, the greater the difference in diameters of the upper and lower edges of a bead, the greater or more pronounced will be the amount by which the lower edge of a rim will be received within the upper portion of the rim of a similar subjacent pan, thereby positively preventing any accidental lateral movement of one stacked pan relative to another such pan or pans.

However, it should be noted and fully appreciated that in those instances where the adjacent faces or edges of the rim portions of nested pans do not, in effect, interlock in the sense of precluding relative lateral motion, the resultant stack of nested pans will still present a solid, stable stack of pans which will not topple over or otherwise become accidentally displaced, by reason of the extensive bearing areas involved.

Figure 8:
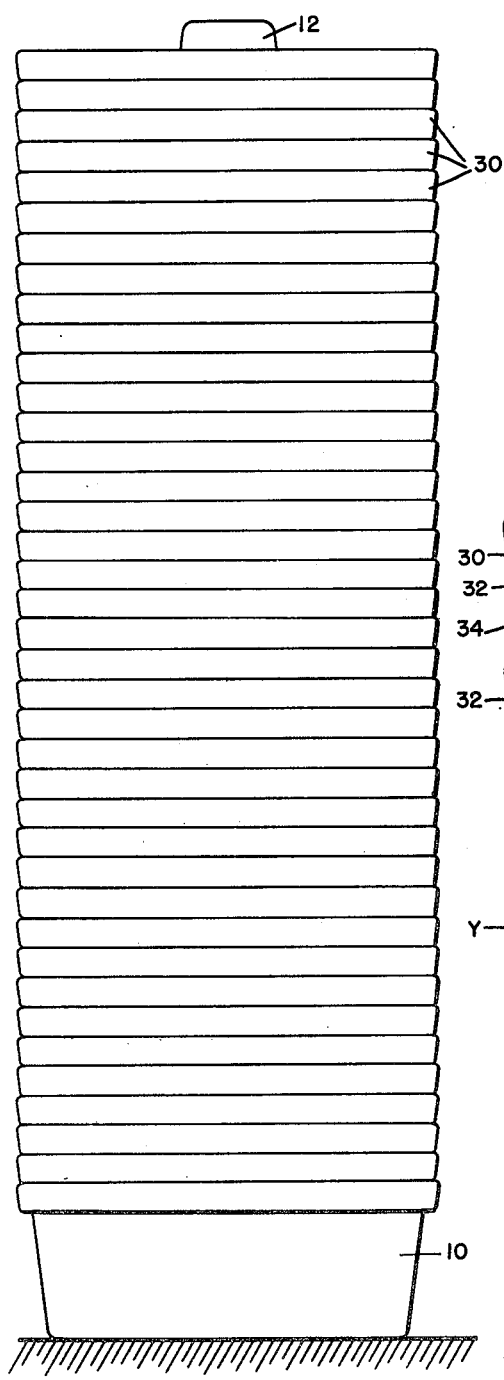
Fig. 8 is a side elevation of a plurality of bake pans provided with rims of the present invention, in a stacked or nested condition.

In the preferred embodiment of my invention, the taper or inclination of central tube 12 and outer walls 16 is from five to ten degrees from vertical, eight degrees being preferred. Assuming now that the tapers of walls 12 and 16 are from five to ten degrees, I have found that if upper and lower walls or edges 24 and 34 of hollow rims 30 are spaced apart by a dimension of from ten to twenty times the thickness of the material from which the pans are fabricated, each superjacent pan will have its various walls physically spaced from corresponding walls of a lower pan in which it is nested. It will be noted that the upper pan will be suspended, throughout its entire maximum circumference, from the upper edge of the lower pan, thereby effecting a uniform load distribution over a maximum, heavily reenforced, sturdy supporting area. The resultant structure, illustrated in Fig. 8, presents a solid, stable stack of pans which will not topple over or become accidentally displaced, however, any one of the individual pans may be quickly, easily and freely lifted from a subjacent pan.

The relationship between the lateral distance between the upper and lower edges of the overhanging rim may be likewise stated as approximating twenty percent of the over-all pan height for side wall and center tube tapers of from five to ten degrees.

It will be observed that the central tubes 12 of the nested pans will, at all times, be physically separated from one another, thereby avoiding damage heretofore so common to such tubes incident to the stacking operation.

Figures 2, 3, 4:
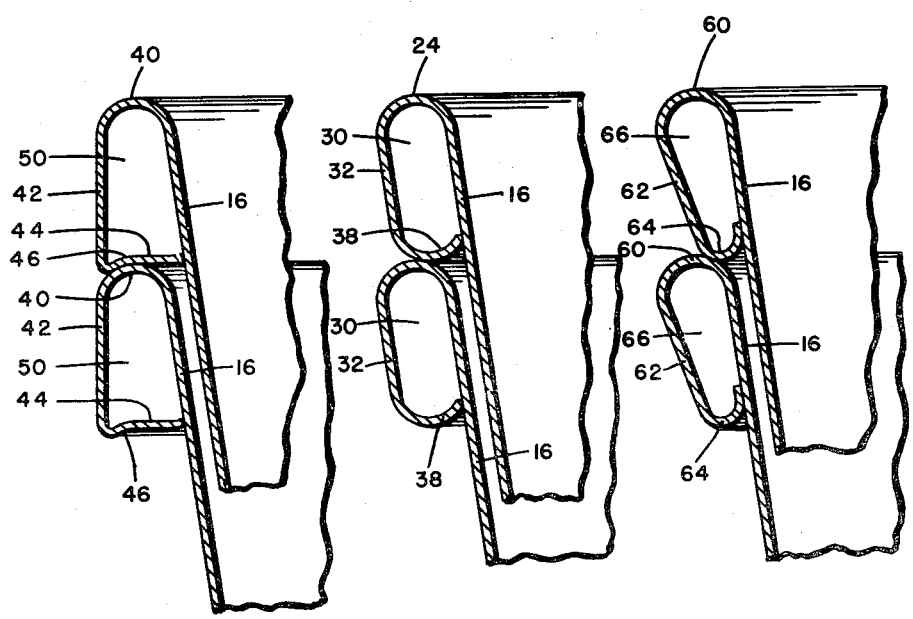
Fig. 2 is a fragmentary vertical section of the upper left portion of a pair of nested bake pans provided with a modified type of rim.
Fig. 3 is a view similar to that of Fig. 2, but differing therefrom in the details of the rim portion.
Fig. 4 is a view similar to that of Fig. 3, but showing a modified type of rim.

With reference now to Fig. 2, it will be noted that the upper edge of walls 16 have been turned outwardly, as at 40, thence vertically downward as at 42, thence inwardly as at 44 back to the outer face of wall 16. Lower wall 44 is provided with a concave annular channel or track portion denoted generally by the numeral 46 which is complementary to upper edge 40, thereby effectively providing cooperative means which will effectively prevent relative lateral shifting of the individual pans of a nested series.

The bead disclosed in Fig. 3 is similar to that disclosed in Fig. 1, differing, however, solely in the manner in which the bottom wall of the bead is rounded upwardly as at 38 to abut side wall 16 of the pan.

With reference now to Fig. 4, it will be observed that the upper edge of side wall 16 is turned outwardly as at 60, thence downwardly as at 62, thence formed or curled inwardly as at 64, to provide rim 66. In the preferred embodiment of the invention, the relationship between the radius of upper edge 60 and lower edge 64 is such that the outer circumference of the lower edge or rim 66 will fit or be receivable within the annular portion or inner circumference of upper reenforced edge 60 which comprises or constitutes an annular socket. Or, stated differently, the third quadrant of the lower edge is receivable in the first quadrant of the upper edge of rim 66 of a subjacent pan as illustrated in Fig. 4. In this manner relative sidewise motion between nested pans is effectively precluded.

In Fig. 7, the upper edge of wall 16 has been turned outwardly to form upper rounded edge 80, thence downwardly in spaced parallelism with wall 16 to provide outer wall 82, the lower end of which is turned inwardly toward the outer face of wall 16 after being provided with a concave track portion 84, which is a complement of the radius 80, thereby providing a resultant rim 86. As clearly illustrated in the drawing when a plurality of pans provided with rim 86 are nested the upper rounded edges 80 will enter and be received within the concave circular channel 84 provided in the lower edge of the rim of a superjacent pan, thereby assuming a non-shiftable relationship for effectively and positively preventing accidental lateral movement of one stacked pan relative to another.

I have found that pans having elongated hollow rims, having characteristics disclosed in the drawings may be formed by spinning or by drawing a single sheet of material to the shapes indicated thereby providing an inexpensive, yet durable and sanitary bake pan having many of those desirable characteristics which the baking industry has long sought for.

The rim structures disclosed likewise have great utility and perform the function of convenient, easy-to-grasp handle members not found in other pans.

It should be understood that various modifications and changes may be made in the structural details of the device, within the scope of the appended claims, without departing from the spirit of the invention.

What is claimed is:

1. A circular bake pan having a bottom and upstanding upwardly and outwardly inclined side walls to provide a receptacle adapted to be nested within a pan of similar construction, wherein the upper edge of said side walls is curvedly turned outwardly, thence downwardly and thence inwardly to provide a hollow, substantially continuous, closed overhanging rim including upper and lower substantially parallel laterally spaced edges the outer dimension of the side walls of said pan in the plane of said lower edge being less than the inner dimension of said pan in the plane of the said upper edge, said lower edge including an annular concave portion dimensioned to receive the upper curved edge of the rim of a similar subjacent pan with which it is nested, for precluding accidental or unintentional lateral shifting of said pans while in nested condition.

2. A circular bake pan comprising a bottom and side walls which extend upwardly and outwardly at an angle of from five to 10 degrees from vertical and terminating in a continuous circular upper edge extending curvedly outwardly and thence downwardly and inwardly inclined toward but in spaced relationship relative to the side walls defining a frusto conical surface and thence curved inwardly toward and contacting the side walls for providing a hollow peripheral rim characterized by a circular, continuous rounded upper edge and a circular, continuous, rounded lower edge in substantial parallelism therewith, the outer dimension of the side walls of the pan in the plane of the said lower edge being less than the inner dimension of said pan in the plane of the said upper edge, said upper edge being thereby dimensioned to receive and automatically center the lower edge of the peripheral rim of a similar pan nested therewith.

JOHN W. KINNEY, Jr.

REFERENCES CITED

The following references are of record in the file of this patent:

UNITED STATES PATENTS

| Number | Name | Date |
|---|---|---|
| 335,251 | Sparrow | Feb. 2, 1886 |
| 1,421,050 | Washington | June 27, 1922 |
| 1,527,897 | Mittinger | Feb. 24, 1925 |
| 1,627,757 | Von Elm | May 10, 1927 |
| 1,707,655 | Cohn | Apr. 2, 1929 |
| 1,713,577 | Wentorf | May 21, 1929 |
| 2,039,374 | Young | May 5, 1936 |
| 2,064,518 | Brogden | Dec. 15, 1936 |
| 2,290,396 | Webster | July 21, 1942 |
| 2,412,325 | Devine | Dec. 10, 1946 |